(12) United States Patent
Guemmer (10) Patent No.: US 7,594,793 B2
(45) Date of Patent: Sep. 29, 2009

(54) TURBOMACHINE WITH FLUID REMOVAL (75) Inventor: Volker Guemmer, Mahlow (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 548 days.

(21) Appl. No.: 11/218,521

(22) Filed: Sep. 6, 2005

(65) Prior Publication Data
US 2006/0051199 A1  Mar. 9, 2006

(30) Foreign Application Priority Data
Sep. 6, 2004  (DE) ....................... 10 2004 043 036

(51) Int. Cl.
F01D 17/00 (2006.01)
(52) U.S. Cl. .................................. 415/144
(58) Field of Classification Search ................. 415/144, 415/201, 169.1, 58.7
See application file for complete search history.

(56) References Cited

U.S. PATENT DOCUMENTS

| | | | |
|---|---|---|---|
| 2,933,238 A | 4/1960 | Stalker | |
| 3,066,912 A | 12/1962 | Scheper | |
| 3,572,960 A | 3/1971 | McBride | |
| 3,694,102 A | 9/1972 | Conrad | |
| 3,846,038 A | 11/1974 | Carriere | |
| 3,993,414 A | 11/1976 | Meauze | |
| 4,155,680 A | 5/1979 | Linko | |
| 4,415,310 A | 11/1983 | Bouiller | |
| 4,642,027 A | 2/1987 | Popp | |
| 5,020,970 A | 6/1991 | Dussourd et al. | |
| 5,059,093 A | 10/1991 | Khalid | |
| 5,203,162 A | 4/1993 | Burge | |
| 5,209,633 A | 5/1993 | McGreehan et al. | |
| 5,230,605 A | 7/1993 | Yamaguchi | |
| 5,327,716 A | 7/1994 | Giffin | |
| 5,480,284 A | 1/1996 | Wadia | |
| 5,762,034 A | 6/1998 | Foss | |
| 5,876,182 A | 3/1999 | Schulte | |
| 6,109,868 A | 8/2000 | Burlman | |
| 6,302,640 B1 | 10/2001 | McKelvey | |
| 6,574,965 B1 | 6/2003 | Feulner | |
| 6,585,479 B2 | 7/2003 | Torrance | |
| 6,663,346 B2 * | 12/2003 | Munsell et al. ........... 416/97 R |

(Continued)

FOREIGN PATENT DOCUMENTS

DE  889 506  9/1953

(Continued)

OTHER PUBLICATIONS

European Search Report dated Aug. 29, 2008 relating to Patent No. 05018097.5.

Primary Examiner—Richard Edgar
(74) Attorney, Agent, or Firm—Timothy J. Klima; Shuttleworth & Ingersoll, PLC (57) ABSTRACT A turbomachine with fluid removal, having at least one stator and at least one downstream rotor, with the stator being provided with stationary blades (1) and the rotor comprising several rotor blades attached to a rotating shaft, with a casing (2) confining the passage of fluid through the rotor and the stator in the outward direction, wherein, in an area of at least one blade (1) of the stator, a provision for fluid removal is provided adjacent to a suction side (3) of the blade (1).

20 Claims, 10 Drawing Sheets

U.S. PATENT DOCUMENTS

| | | |
|---|---|---|
| 7,097,414 B2 | 8/2006 | Strangeland |
| 7,364,404 B2 * | 4/2008 | Guemmer .................. 416/91 |
| 2003/0026695 A1 | 2/2003 | Schmuecker |
| 2003/0033815 A1 | 2/2003 | Proctor et al. |
| 2004/0081552 A1 | 4/2004 | Guemmer |
| 2005/0019152 A1 | 1/2005 | Seitz |
| 2005/0226717 A1 | 10/2005 | Xu |
| 2006/0104805 A1 | 5/2006 | Gummer |

FOREIGN PATENT DOCUMENTS

| | | |
|---|---|---|
| DE | 1 042 828 | 11/1958 |
| DE | 1 428 188 | 11/1968 |
| DE | 3407945 | 9/1985 |
| DE | 19 63 22 07 | 2/1998 |
| DE | 10 135 003 C1 | 10/2002 |
| DE | 10233032 | 1/2004 |
| DE | 10 330 084 A1 | 3/2004 |
| EP | 0 049 655 | 4/1982 |
| EP | 04 97 574 B1 | 9/1995 |
| EP | 07 18 469 B1 | 12/1995 |
| EP | 07 19 908 B1 | 3/2000 |
| EP | 1013937 A2 | 6/2000 |
| EP | 1 286 022 | 2/2003 |
| EP | 1 329 615 | 7/2003 |
| GB | 619 722 | 3/1949 |
| GB | 987625 | 3/1965 |
| GB | 2 388 875 | 11/2003 |

* cited by examiner

Section F-F in Fig. 4a, b

Inclination of removal duct in meridional direction: 15° < β < 75°

TURBOMACHINE WITH FLUID REMOVAL

This application claims priority to German Patent Application DE 102004043036.5 filed Sep. 6, 2004, the entirety of which is incorporated by reference herein.

BACKGROUND OF THE INVENTION

This invention relates to a turbomachine with fluid removal. This invention relates to turbomachines, such as blowers, compressors, pumps and fans of the axial, semi-axial and radial type. The working medium or fluid may be gaseous or liquid.

More particularly, this invention relates to a turbomachine with at least one rotor, but it may also include one stage or several stages, each of them employing one rotor and one stator. A casing exists which confines the passage of fluid through the rotors and stators in the outward direction. The rotor includes a multitude of rotor blades which are connected to a rotating shaft and transmit energy to the working medium. The blades of the rotor have free ends or are shrouded on the casing side. The stator includes a multitude of stationary blades which have fixed ends on the casing side and/or the hub side. The turbomachine can be of single or multi-shaft design.

Figure 1:
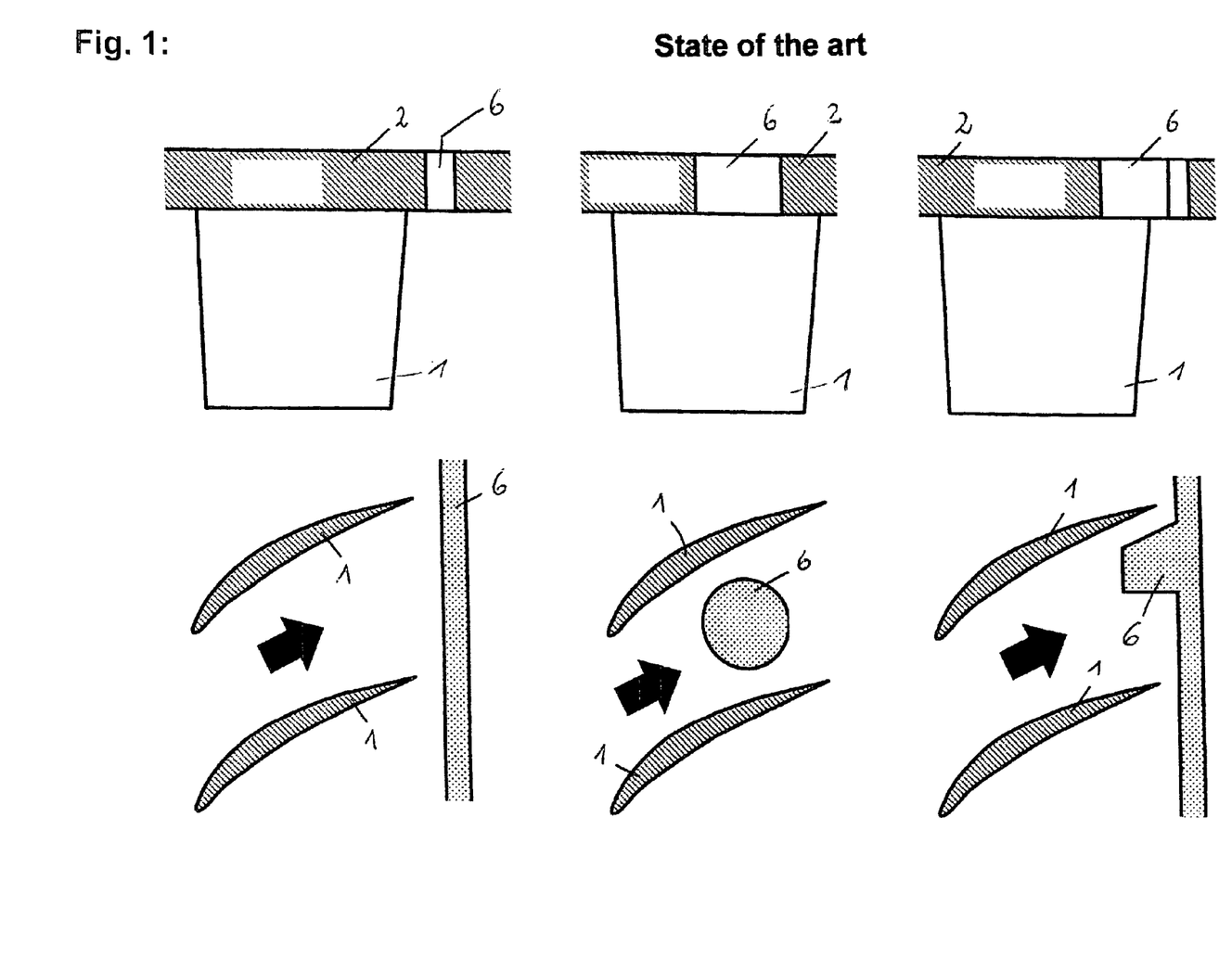
FIG. 1 is a schematic representation of the state of the art.

A common requirement on turbomachines, such as blowers, compressors, pumps and fans, is the provision of secondary fluid quantities at the walls of the main flow path. As shown in FIG. 1, slots are normally provided on the hub or casing wall for removal of the required fluid quantities, these slots being arranged in the unbladed areas between two blade rows of the machine and extending partly or fully over the circumference. In some cases, the fluid removal means extends over parts of the circumference upstream into a blade row. Also state-of-the-art are fluid removal means within the blade passage which are circular, oval or otherwise geometrically simply designed and, due to their shape and position in the passage, are very detrimental to the flow in the respective blade row and to the efficiency of the entire turbomachine.

In FIG. 1, the schematically shown blade is indicated by the reference numeral 1, with the upper variants in FIG. 1 showing side views in radial sections and the bottom representations being sectional views in circumferential direction. The wall of the casing is marked 2. Reference numeral 6 indicates a fluid removal opening.

The state of the art is disadvantageous in that additional construction length and/or losses in the efficiency of the turbomachine must be accepted for realization. On aircraft engines, conventional fluid removal means arranged within the compressor are disadvantageous with regard to construction length, construction weight and fuel consumption.

The state of the art presently does not provide for an efficient combination of secondary fluid supply and favorable influencing of the flow in the turbomachine.

BRIEF SUMMARY OF THE INVENTION

A broad aspect of the present invention is to provide a mechanism for fluid removal on at least one blade row of a turbomachine by which, while avoiding the state of the art, both secondary fluid is provided and an increase in efficiency by favorably influencing the flow in the turbomachine is obtained.

It is a particular object of the present invention to provide solution to the above problems by a combination of the features described herein. Further advantageous embodiments of the present invention will be apparent from the description below.

In accordance with the present invention, a fluid removal mechanism is provided on the inner or the outer wall of the turbomachine within at least one blade passage of a rotor or stator blade row, whose opening is situated close to and orientated essentially along the blade suction side and, as viewed in the profile chord direction, has longish shape and varying width.

BRIEF DESCRIPTION OF THE DRAWINGS

The present invention is more fully described in light of the accompanying figures showing preferred embodiments. In the drawings.

DETAILED DESCRIPTION OF THE INVENTION

FIG. 1 shows, in highly simplified representation, configurations of state-of-the-art fluid removal means: an annular slot behind the blade row, simple holes with round or oval shape without specific position, or an annular slot behind the blade row with extensions into the passage.

Figure 2:
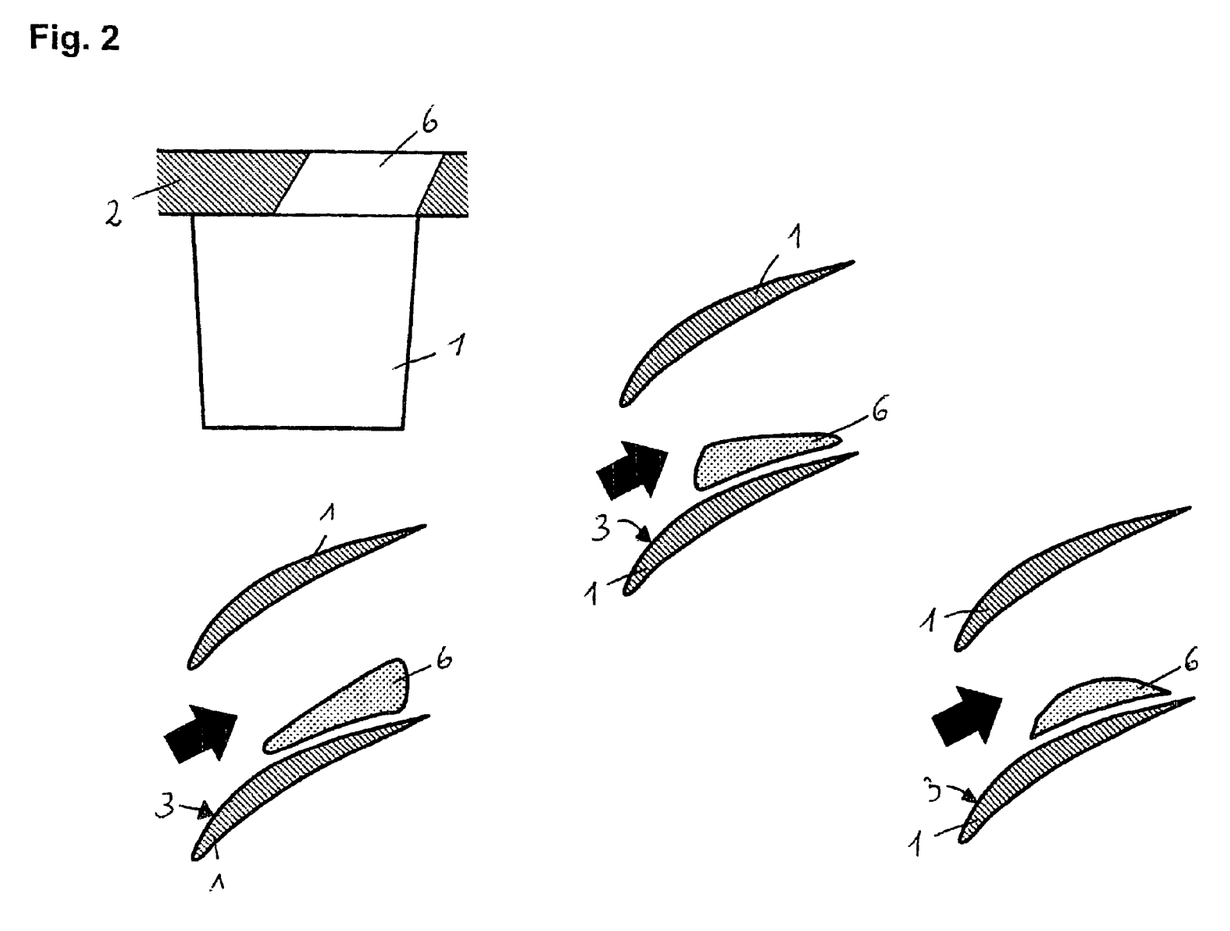
FIG. 2 is a schematic representation of the basic concept in accordance with the present invention.

FIG. 2 shows, in highly simplified representation, the inventive solution on a configuration including a wall and blade row. Here, any combination of rotor or stator blade row(s) with a hub or casing wall of the turbomachine is possible. The inventive fluid removal means is situated in at least one passage between two blades limited by the leading and trailing edge plane. The blade row is flown from the left, as indicated by the arrowhead. The opening of the fluid removal means is situated near the blade suction side and is longish in blade chordal direction.

In FIG. 2 and each of the following figures, the fluid removal opening is indicated by the reference numeral 6. It is also designated FRO hereinafter.

Figure 3:
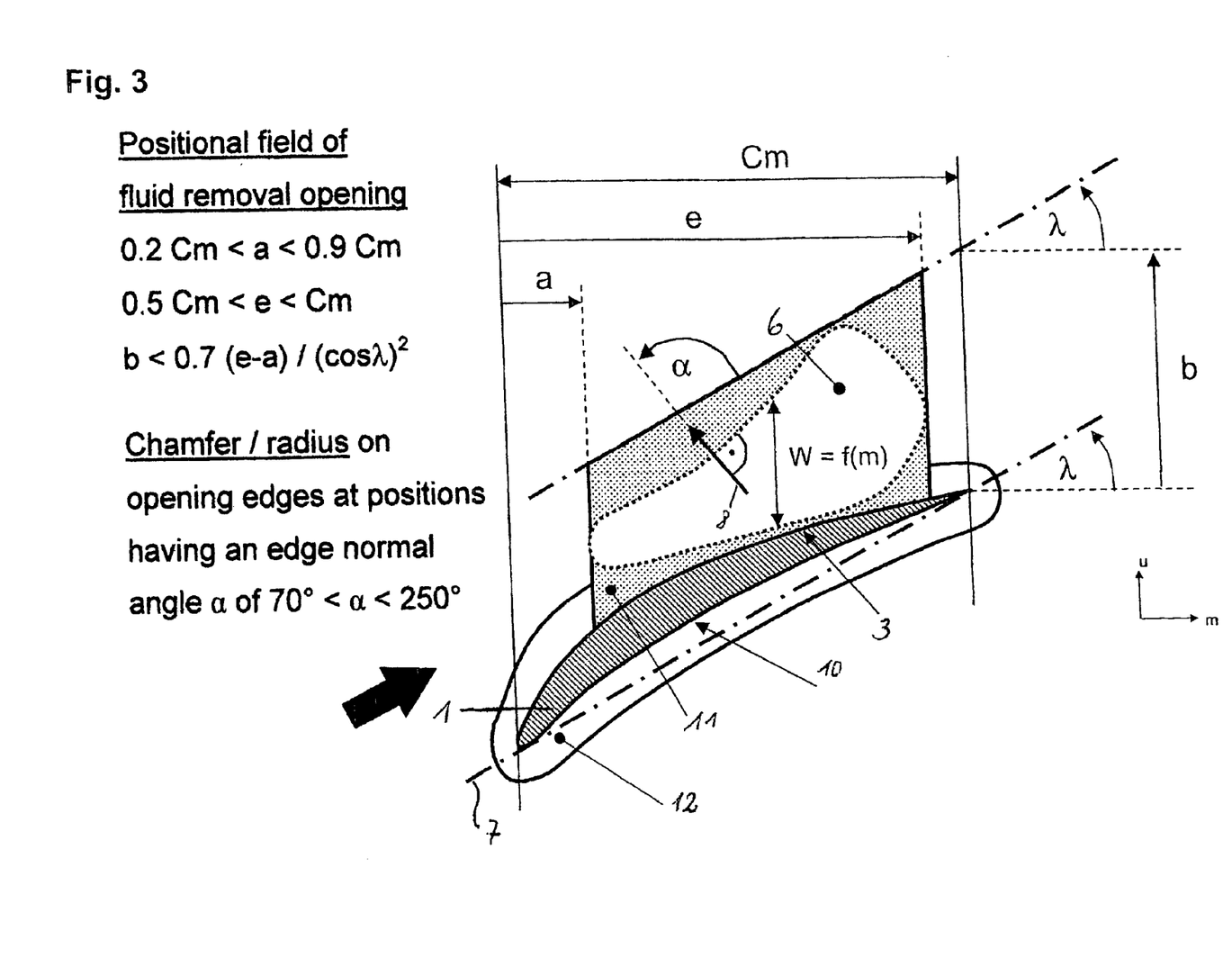
FIG. 3 is a definition of the fluid removal opening.

FIG. 3 defines the design limits of the fluid removal opening 6 (FRO). Considered here is the wall section of a blade in a plane set up by the meridional direction "m" and the circumferential direction "u". The blade section has the meridional length "Cm". The flow direction is indicated by an arrowhead. In plane "m-u", a positional field for the fluid removal opening 6 (FRO) is defined by three limiting lines. On the side facing the inflow, the limit is defined by a circumferential line which has a distance "a" from a circumferential baseline positioned at a leading tip of the blade 1 to a profile leading edge measured in the meridional direction "m". On a side looking away from the inflow, a circumferentially orientated line which has a distance "e" from the circumferential baseline measured in the meridional direction "m" is used. As a limit at an upper side of the FRO facing a next blade profile, an upper limiting line is used which is parallel to the profile chord 7 of the blade 1, the upper limiting line positioned at a distance b from the profile chord 7 measured in circumferential direction "u". The profile chord 7 of the blade wall section extends at an angle λ to the meridional direction "m". In accordance with the present invention, the dimensions of the distances a, e and b are defined as follows:

$$0.2Cm < a < 0.9Cm$$

$$0.5Cm < e < Cm$$

$$b < 0.7(e-a)/(\cos \lambda)^2$$

A circumferentially measured width "W" of the fluid removal opening 6 (FRO) varies from a constant width as a function of the meridional coordinate: W=f(m).

Finally, it is particularly favorable if the edges of the fluid removal opening 6 (FRO) facing the flow (leading edges) are provided with a chamfer 4 or radius 5. See FIGS. 4c and 4d. While permissible, it is not necessary to provide the chamfer/radius around the entire periphery of the FRO. Rather, in one embodiment, the chamfer radius is provided only around a leading edge of the FRO 6. In a preferred embodiment, starting and ending points for the chamfer/radius around a periphery of the Fluid removal opening 6 can be established by an angle α measured between the upper limiting line and an "edge normal" line 8. The edge normal line 8 intersects an edge of the FRO 6 at a normal angle and then extends to also intersect the upper limiting line. In a preferred embodiment, α is between 70° and 250° (70°<α<250°) and any range therein, with the 70° angle establishing a limit for the starting point of the chamfer/radius around the periphery of the FRO 6 and the 250° angle establishing a limit for the ending point of the chamfer/radius around the periphery of the FRO 6, with the chamfer/radius being provided around a leading edge of the FRO 6 between the starting and ending points. FIG. 3 shows an edge normal line 8 that is set at a normal (90°) angle to an edge of the FRO 6 and then is extended to intersect the upper limiting line, with the angle α being measured between the upper limiting line (right side in FIG. 3) and the intersecting edge normal line 8. The edge normal line 8 shown in FIG. 3 is at an angle α of about 100°. In accordance with the present invention, edge phases and longer, upstream inlet ramps shall also be considered as a chamfer/radius.

Figure 4A:
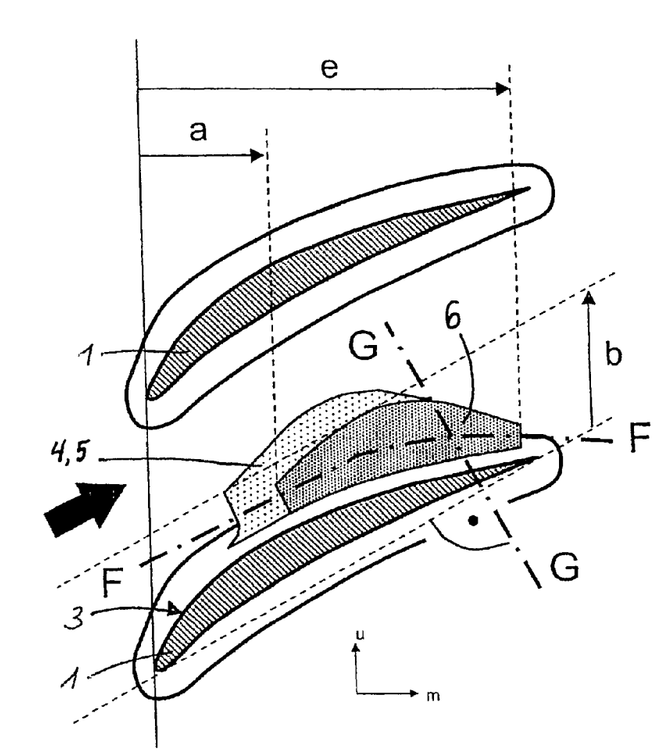
FIG. 4a shows solutions in accordance with the present invention.
Figure 4B:
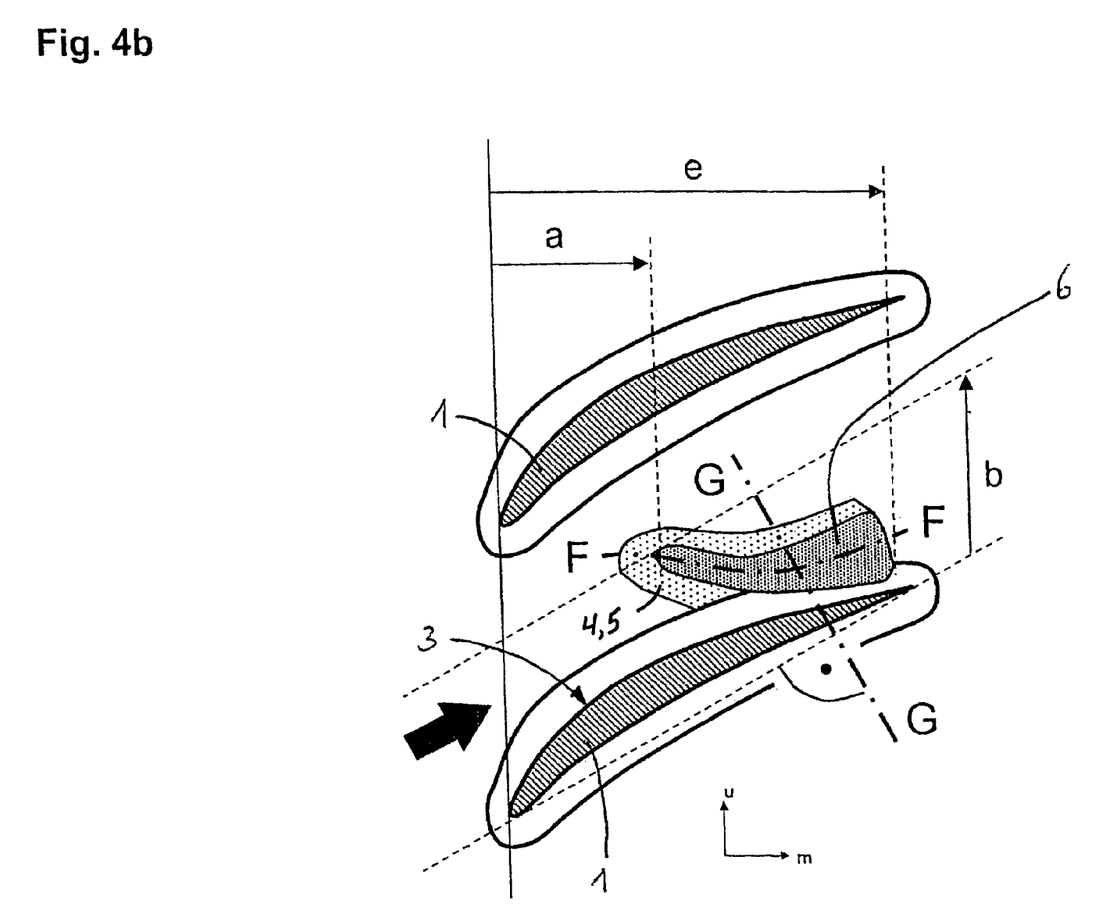
FIG. 4b shows solutions in accordance with the present invention.

FIGS. 4a and 4b show chamfered/radiused portions of respective fluid removal openings 6, with the fluid removal openings 6 being shaded darker and the chamfered/radiused portions being shaded lighter and only extending around leading edges of the FRO 6 within the limits described above. The upper limiting line described above sets the upper limit for the fluid removal opening 6 only and not for the chamfered or radiused portions 4, 5. Thus, the chamfered/radiused portions can extend beyond the upper limiting line. The same is true for dimensions "a" and "e", which set the limits for the fluid removal opening 6 and not for the chamfered/radiused portions 4, 5. See FIGS. 4a and 4b.

Furthermore, FIG. 3 shows the pressure side of the blade 1, indicated by the reference numeral 10. Reference numeral 11 indicates the positional field of the fluid removal opening 6. Reference numeral 12 indicates the radius of the blade 1.

FIG. 4a shows two favorable variants of the fluid removal mechanism provided by the present invention, identifying the positional field 11 of the fluid removal opening 6 (FRO) and the dimensions a, e and b. Typical of these solutions is the close orientation to the blade suction side and an increase of the width W in blade profile chordal direction provided at least over parts of the fluid removal opening 6 (FRO).

As shown in FIG. 4b, it can be particularly favorable in accordance with the present invention to increase the distance of the fluid removal opening 6 (FRO) to the blade suction side, as viewed against the inflow direction, thus providing the fluid removal opening 6 (FRO) with substantial convexity towards the suction side.

Figure 4C:
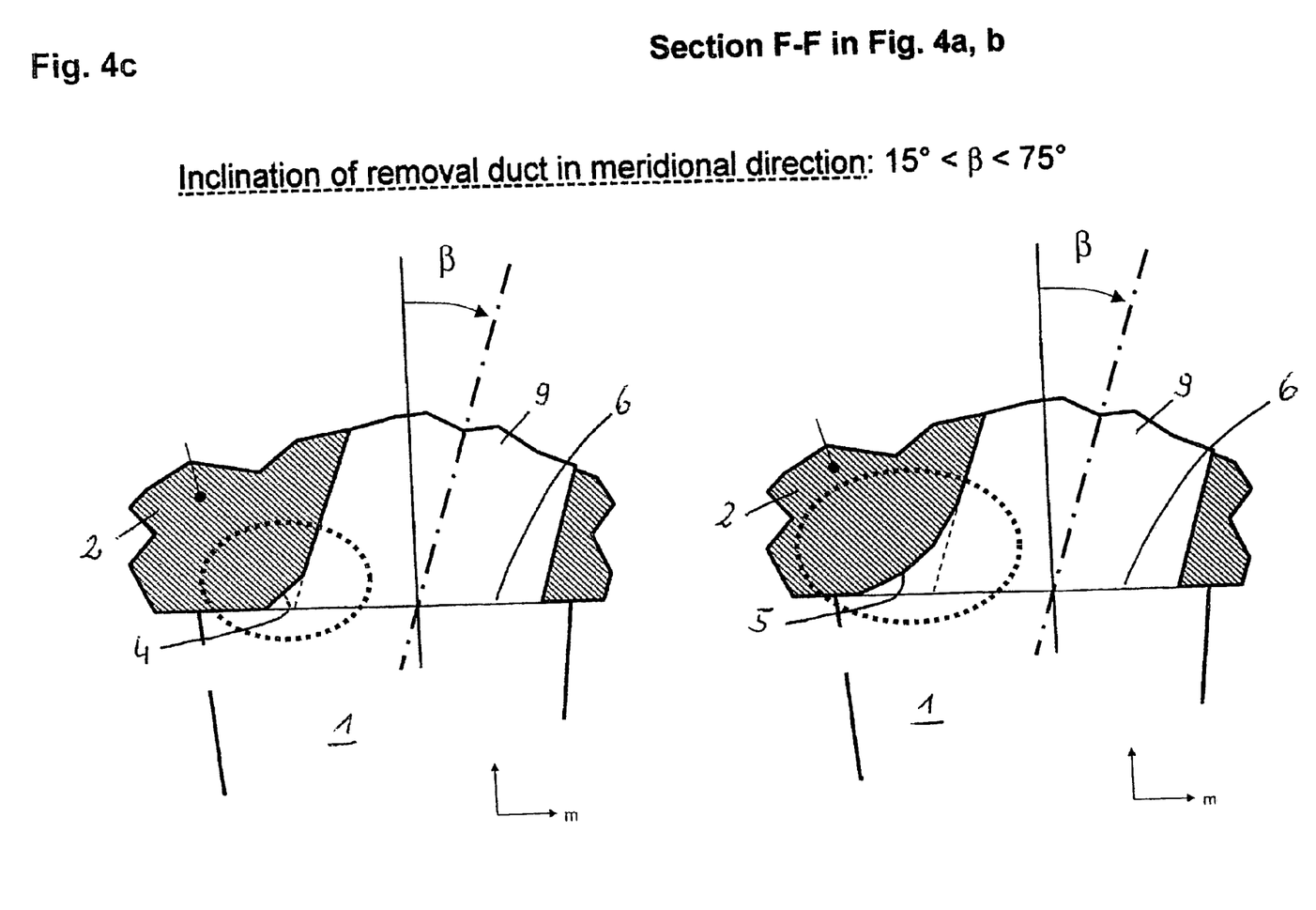
FIG. 4c shows solutions in accordance with the present invention, section F-F in FIG. 4a, b.

FIG. 4c shows the section F-F according to FIG. 4a, b. Shown are examples of edge chamfer and edge radius at the fluid removal opening 6 (FRO) provided by the present invention. The fluid removal opening 6 (FRO) connects to a removal duct 9 which, for simplified visualization, is shown straight in the sectional plane, but can also have freely curved walls in accordance with the present invention.

The centerline of the removal duct 9 connecting to the fluid removal opening 6 (FRO) is inclined in the environment of the fluid removal opening 6 (FRO) by the angle β to the normal on the meridional direction m (15°<β<75°).

Figure 4D:
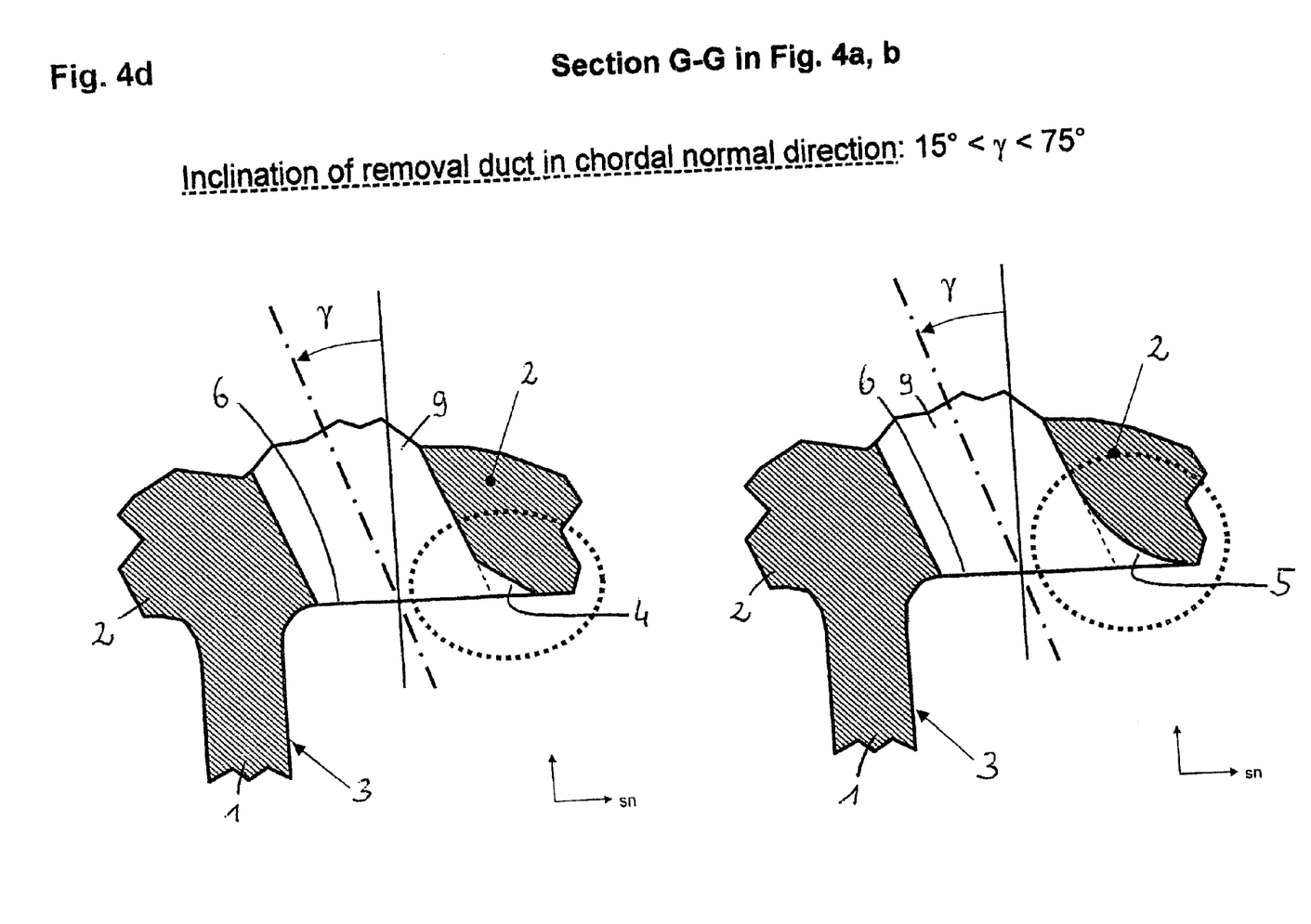
FIG. 4d shows solutions in accordance with the present invention, section G-G in FIG. 4a, b.

FIG. 4d shows the section G-G according to FIGS. 4a and 4b. Here again, examples of edge chamfer and edge radius at the fluid removal opening 6 (FRO) as provided by the present invention are shown. The fluid removal opening 6 (FRO) connects to the removal duct 9, which, for simplified visualization, is shown straight also in this sectional plane, but can have freely curved walls in accordance with the present invention. The centerline of the removal duct 9 connecting to the fluid removal opening 6 (FRO) is inclined in the environment of the fluid removal opening 6 (FRO) by the angle γ to the normal on the chordal normal direction sn (15°<γ<75°).

Figure 5A:
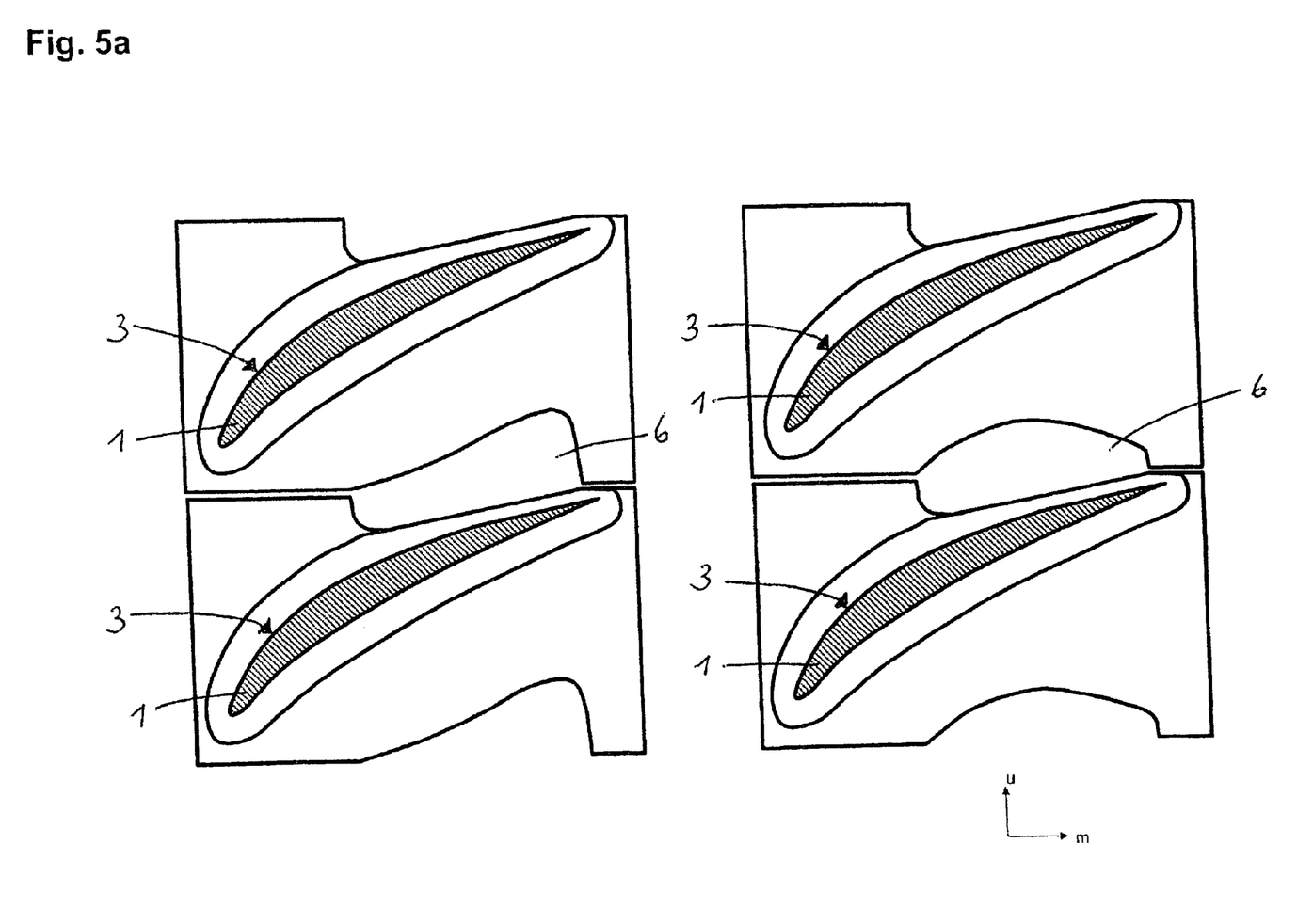
FIG. 5a shows solutions in accordance with the present invention for a blade row with individual platforms, without edge chamfer/radius at the fluid removal opening.
Figure 5B:
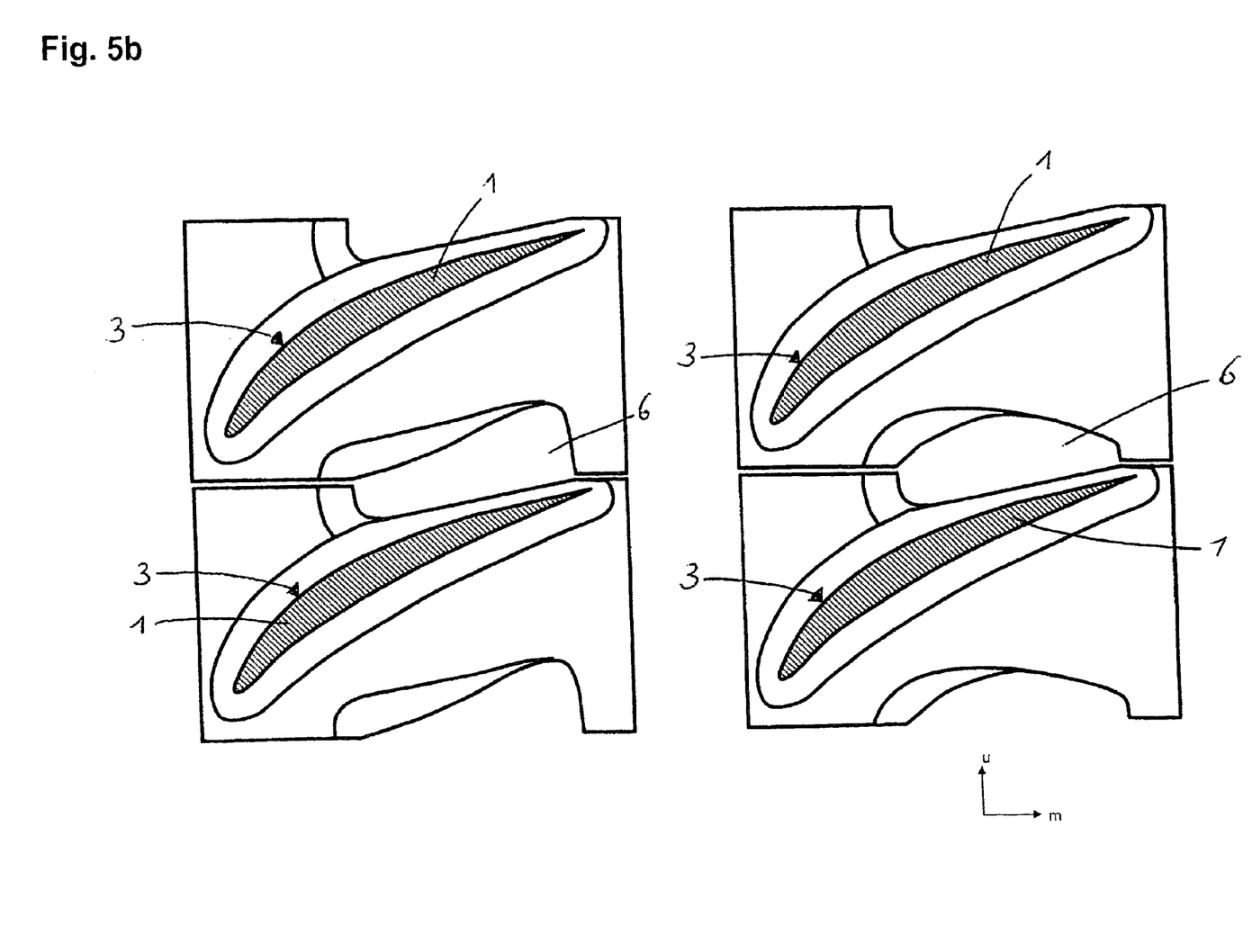
FIG. 5b shows solutions in accordance with the present invention for a blade row with individual platforms, with edge chamfer/radius at the fluid removal opening.

On designs with individual blade platforms, it is favorable in accordance with the present invention to provide the fluid removal opening 6 (FRO) by means of the side flanks of two adjacent platforms. FIG. 5a shows this approach for two inventive solutions of the fluid removal opening 6 (FRO) without edge chamfer/radius and in-line partial sections of the respective side flanks. FIG. 5b shows solutions with edge chamfer/radius of the fluid removal opening 6 (FRO).

Figure 5C:
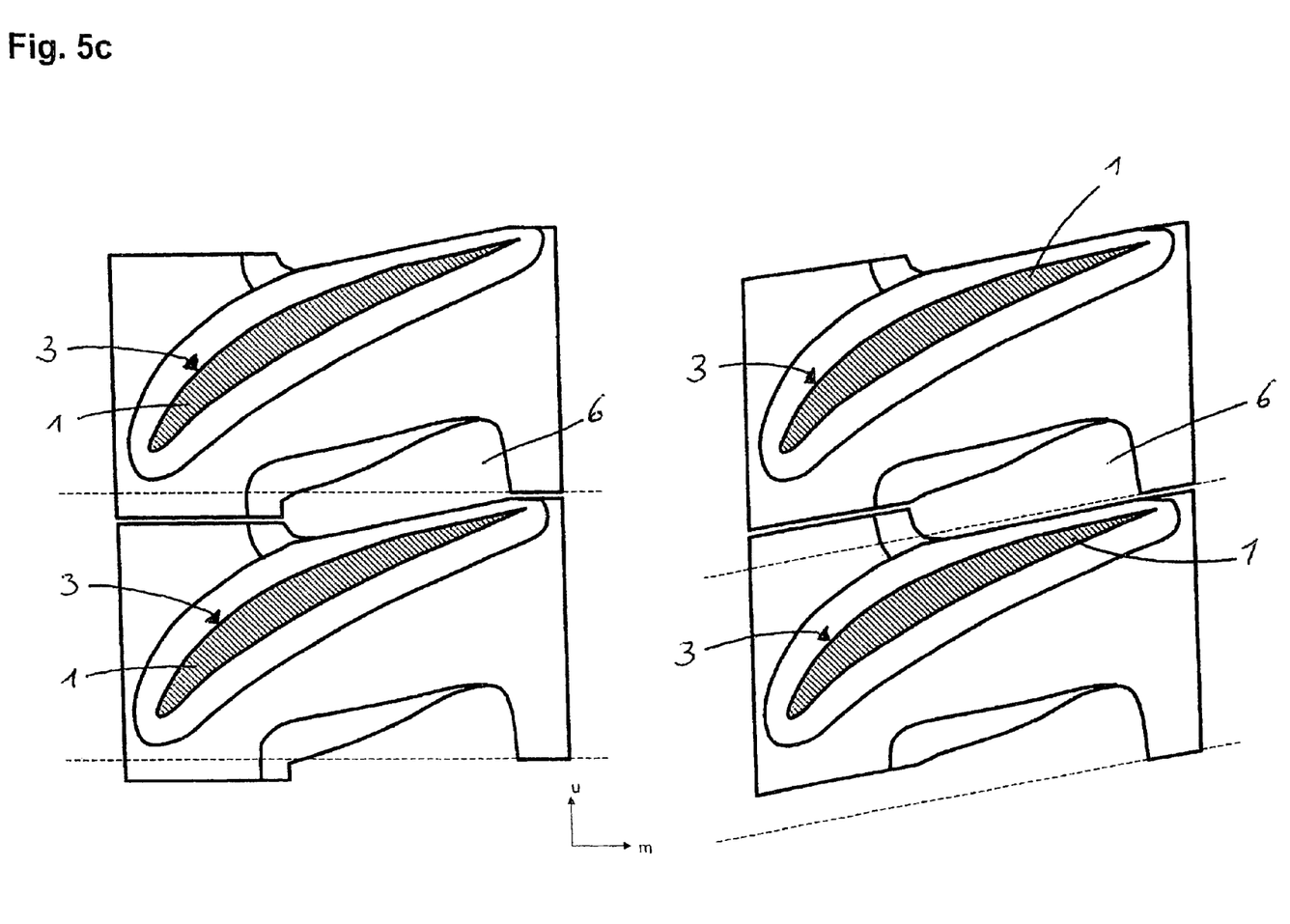
FIG. 5c shows solutions in accordance with the present invention for a blade row with individual platforms and offset at the platform side edges.

On designs with individual blade platforms, it is furthermore particularly favorable in accordance with the present invention to provide the fluid removal opening 6 (FRO) by means of the side flanks of two adjacent platforms whose partial sections of the respective side flanks are not in line, but are parallely offset to each other. FIG. 5c shows inventive solutions for a fluid removal opening 6 (FRO) with edge chamfer/radius 4/5, on the left-hand side of the illustration for a rectangular platform edge arrangement, on the right-hand side of the illustration for an oblique platform edge arrangement.

In detail, FIG. 5a shows inventive solutions for a blade row with individual platforms without edge chamfer or edge radius on the fluid removal opening 6. FIG. 5b shows inventive solution variants for a blade row with individual platforms with edge chamfer or edge radius on the fluid removal opening 6. FIG. 5c shows inventive solution variants for a blade row with individual platforms and offset of the platform side edges.

The present invention accordingly provides especially for the following advantages:

The fluid removal opening in accordance with the present invention enables secondary fluid to be provided on a turbomachine, while permitting blade envelopment in the main flow path to be positively influenced. This can be accomplished on the most varied types of turbomachinery, such as blowers, compressors, pumps and fans. Measured on the example of a 6-stage engine compressor, the improvement of the compressor total efficiency per blade row affected amounts to 0.20% to 0.30%.

LIST OF REFERENCE NUMERALS

1 Blade
2 Casing (wall)
3 Suction side of blade 1
4 Edge chamfer
5 Edge radius
6 Fluid removal opening (FRO)
7 Profile chord of blade 1
8 Edge normal
9 Removal duct
10 Pressure side of blade 1
11 Positional field of FRO 6
12 Radius of blade 1

What is claimed is:

1. A turbomachine with fluid removal; comprising:
at least one stator and at least one downstream rotor, the stator comprising a plurality of stationary blades and the rotor comprising a plurality of rotor blades attached to a rotating shaft;
a casing outwardly confining passage of a fluid though the rotor and the stator; and
at least one fluid removal opening provided adjacent to a suction side of at least one blade of the stator, the fluid removal opening being convex towards a blade suction side, the fluid removal opening, as a whole, being closer to the suction side of the at least one blade of the stator than to a pressure side of a further immediately adjacent blade.

2. A turbomachine in accordance with claim 1, wherein the fluid removal opening is provided on the casing.

3. A turbomachine in accordance with claim 2, wherein the following relationship applies to the fluid removal opening:

$$0.2Cm < a < 0.9Cm$$

$$0.5Cm < e < Cm$$

$$b < 0.7(e-a)/(\cos \lambda)^2$$

where
m is a meridional direction,
u is a circumferential direction,
Cm is a meridional length of a section of the blade,
e is a distance measured in the meridional direction m to a profile leading edge of the blade,
b is a distance measured in the circumferential direction u parallel to a profile chord applied to a pressure side of the blade.

4. A turbomachine in accordance with claim 3, wherein at least a selected portion of a periphery of the fluid removal opening is provided with at least one of a chamfer and a radius, wherein an angle $\alpha$ between an upper limiting line of the fluid removal opening and an edge normal line at the selected portion of the periphery is between 70° and 250°.

5. A turbomachine in accordance with claim 3, wherein a circumferentially measured width (W) of the fluid removal opening is not constant, but varies freely as a function of the meridional coordinate (m), resulting in the following equation:

$$W = f(m) \neq \text{constant}.$$

6. A turbomachine in accordance with claim 3, and further comprising a removal duct connected to the fluid removal opening, a center line of the removal duct being inclined in a vicinity of the fluid removal opening by an angle $\beta$ to a line normal on a meridional direction (m), where:

$$15° < \beta < 75°.$$

7. A turbomachine in accordance with claim 6, wherein the center line of the removal duct is inclined in the vicinity of the fluid removal opening by an angle $\gamma$ to a line normal on a chordal normal direction (sn), where:

$$15° < \gamma < 75°.$$

8. A turbomachine in accordance with claim 6, wherein the center line of the removal duct is inclined in the vicinity of the fluid removal opening by an angle $\gamma$ to a line normal on a chordal normal direction (sn), where:

$$15° < \gamma < 75°.$$

9. A turbomachine in accordance with claim 1, wherein the fluid removal opening is provided on a hub of the blades of the stator.

10. A turbomachine in accordance with claim 9, wherein the following relationship applies to the fluid removal opening:

$$0.2Cm < a < 0.9Cm$$

$$0.5Cm < e < Cm$$

$$b < 0.7(e-a)/(\cos \lambda)^2$$

where
m is a meridional direction,
u is a circumferential direction,
Cm is a meridional length of a section of the blade,
e is a distance measured in the meridional direction m to a profile leading edge of the blade,
b is a distance measured in the circumferential direction u parallel to a profile chord applied to a pressure side of the blade.

11. A turbomachine in accordance with claim 1, wherein the following relationship applies to the fluid removal opening:

$$0.2Cm < a < 0.9Cm$$

$$0.5Cm < e < Cm$$

$$b < 0.7(e-a)/(\cos \lambda)^2$$

where
m is a meridional direction,
u is a circumferential direction,
Cm is a meridional length of a section of the blade,
e is a distance measured in the meridional direction m to a profile leading edge of the blade,
b is a distance measured in the circumferential direction u parallel to a profile chord applied to a pressure side of the blade.

12. A turbomachine in accordance with claim 11, wherein a circumferentially measured width (W) of the fluid removal opening is not constant, but varies freely as a function of the meridional coordinate (m), resulting in the following equation:

$$W = f(m) \neq \text{constant}.$$

13. A turbomachine in accordance with claim 11, and further comprising a removal duct connected to the fluid removal opening, a center line of the removal duct being inclined in a vicinity of the fluid removal opening by an angle β to a line normal on the meridional direction (m), resulting in the following equation:

$$15° < \beta < 75°.$$

14. A turbomachine in accordance with claim 13, wherein the center line of the removal duct is inclined in the vicinity of the fluid removal opening by an angle γ to a line normal on a chordal normal direction (sn), resulting in the following equation:

$$15° < \gamma < 75°.$$

15. A turbomachine in accordance with claim 11, wherein at least a selected portion of a periphery of the fluid removal opening is provided with at least one of a chamfer and a radius, wherein an angle α between an upper limiting line of the fluid removal opening and an edge normal line at the selected portion of the periphery is between 70° and 250°.

16. A turbomachine in accordance with claim 15, wherein the edge of the fluid removal opening is provided with a radius.

17. A turbomachine in accordance with claim 15, wherein the edge of the fluid removal opening is provided with an edge chamfer.

18. A turbomachine in accordance with claim 1, and further comprising a removal duct connected to the fluid removal opening, a center line of the removal duct being inclined in a vicinity of the fluid removal opening by an angle β to a line normal on a meridional direction (m), where:

$$15° < \beta < 75°.$$

19. A turbomachine in accordance with claim 1, and further comprising a removal duct connected to the fluid removal opening, a center line of the removal duct being inclined in a vicinity of the fluid removal opening by an angle γ to a line normal on a chordal normal direction (sn), where:

$$15° < \gamma < 75°.$$

20. A turbomachine in accordance with claim 1, wherein at least a selected portion of a periphery of the fluid removal opening is provided with at least one of a chamfer and a radius, wherein an angle α between an upper limiting line of the fluid removal opening and an edge normal line at the selected portion of the periphery is between 70° and 250°.

* * * * *